United States Patent [19]

Dorrell

[11] Patent Number: 4,832,607

[45] Date of Patent: May 23, 1989

[54] WATERING SYSTEM DISPLAY STAND

[75] Inventor: Paul L. Dorrell, Tigard, Oreg.

[73] Assignee: Wade Manufacturing Co., Portland, Oreg.

[21] Appl. No.: 216,781

[22] Filed: Jul. 8, 1988

[51] Int. Cl.[4] .......................... G09B 23/38; G09F 5/00

[52] U.S. Cl. .................................... 434/429; 434/295; 47/82; 211/13

[58] Field of Search ................. 434/40, 429, 369, 276, 434/295, 296, 297, 433; 47/82; 211/13

[56] References Cited

U.S. PATENT DOCUMENTS

| | | | |
|---|---|---|---|
| 875,235 | 12/1907 | Bastel | 47/82 |
| 3,269,578 | 8/1966 | Lewis | 434/297 |
| 3,869,829 | 3/1975 | Chiosso | 434/276 |
| 4,756,120 | 7/1988 | Arledge | 47/82 |

FOREIGN PATENT DOCUMENTS

| | | | |
|---|---|---|---|
| 2506148 | 11/1982 | France | 211/13 |

*Primary Examiner*—Edward M. Coven
*Assistant Examiner*—Valerie Szczepanik
*Attorney, Agent, or Firm*—Phillips, Moore, Lempio & Finley

[57] ABSTRACT

A watering system display stand comprises a display panel having a variety of garden plants graphically displayed thereon and a watering system, including a plurality of authentic interconnected irrigation components, mounted on the display panel to visually portray a typical mock, instructional watering system for the garden plants. A plurality of trays are mounted vertically below the display panel to retain corresponding irrigation components therein for purchase by a consumer. The trays are numerically coded to match corresponding codes imprinted adjacent to corresponding irrigation components mounted on the display panel. Rolls of porting and drip tubing are mounted on the display stand, below the trays. The trays are formed from suitably scored paperboard blanks that are folded to form interlocked panels.

16 Claims, 7 Drawing Sheets

WATERING SYSTEM DISPLAY STAND

TECHNICAL FIELD

This invention relates to a display stand and more particularly to a display stand having a mock, instructional watering system secured thereon and corresponding irrigation components thereof retained in trays on the stand.

BACKGROUND OF THE INVENTION

The advent of drip irrigation type watering systems for garden use has given rise to the need for a display stand that will provide ready and easily understood access to various components used in the systems. Such components include drip and porting tubing, drippers, connectors and the like. Current marketing practices generally involve the placing of various irrigation components in individual trays or bins on a display rack whereby the buyer necessarily requires prior knowledge of the system components and their use in a watering system before a purchase is made. Since many systems of this type are installed by a layman do-it-yourselfer, the prospect of a buyer purchasing the wrong components is usually quite high.

SUMMARY OF THE INVENTION

An object of this invention is to provide an economical, portable, readily installed and self-instructional watering system display stand for consumers.

The display stand comprises a display panel having graphic display means thereon for depicting a variety of garden plants, such as trees, shrubs, flowers and the like. A watering system, including a plurality of authentic interconnected irrigation components, is mounted on the display panel for visually portraying a typical mock, instructional watering system for the plants. Trays are mounted on the display stand for holding and openly displaying corresponding ones of the irrigation components.

In the preferred embodiment of this invention, each irrigation component of the watering system, mounted on the display panel, is numerically coded with such coding corresponding to identical codes marked on the individual trays.

BRIEF DESCRIPTION OF THE DRAWINGS

Other object of this invention will become apparent from the following description and accompanying drawings wherein.

DESCRIPTION OF THE PREFERRED EMBODIMENT

General Description

Figure 1:
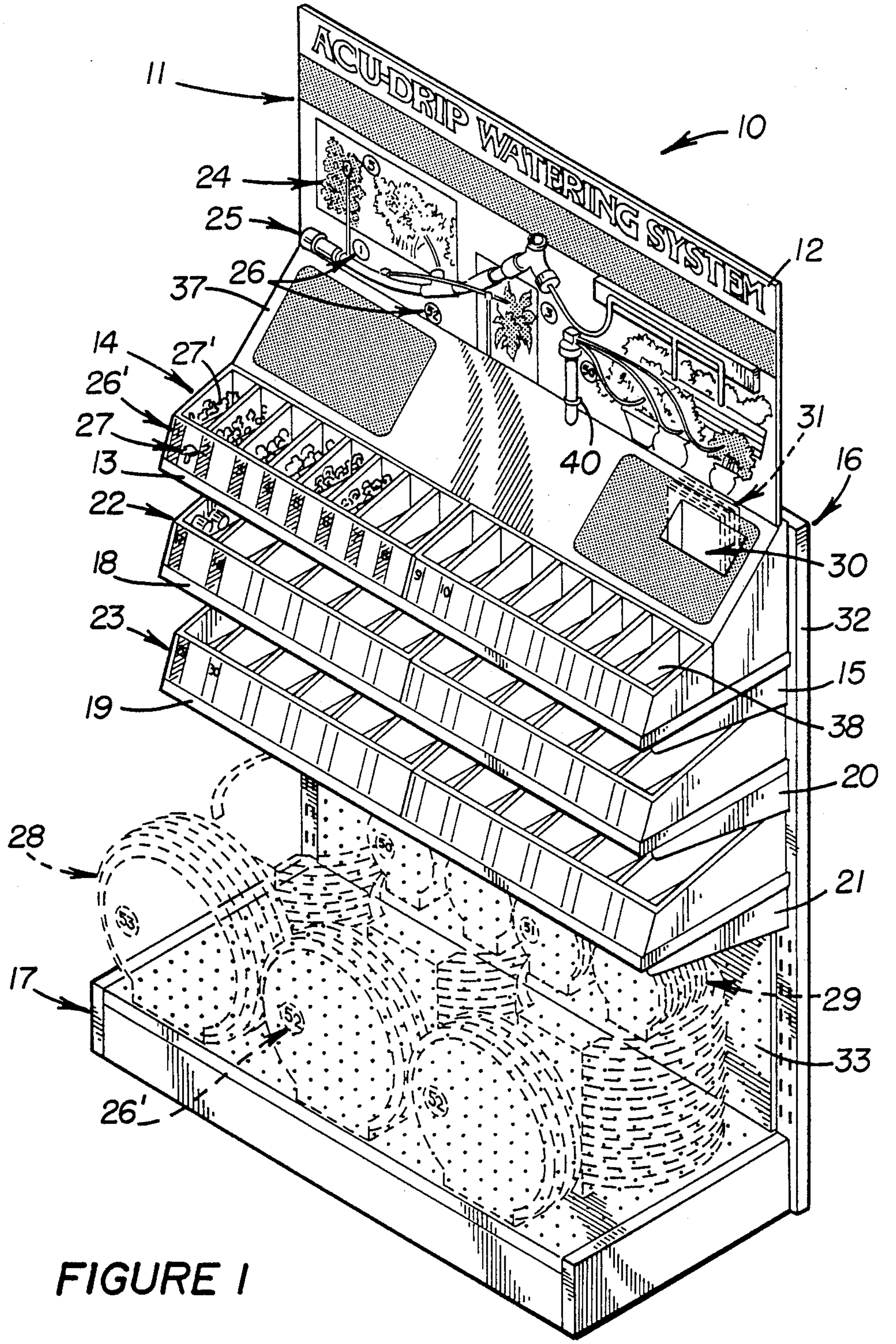
FIG. 1 is a frontal isometric view of a watering system display stand embodying this invention.
Figure 4:
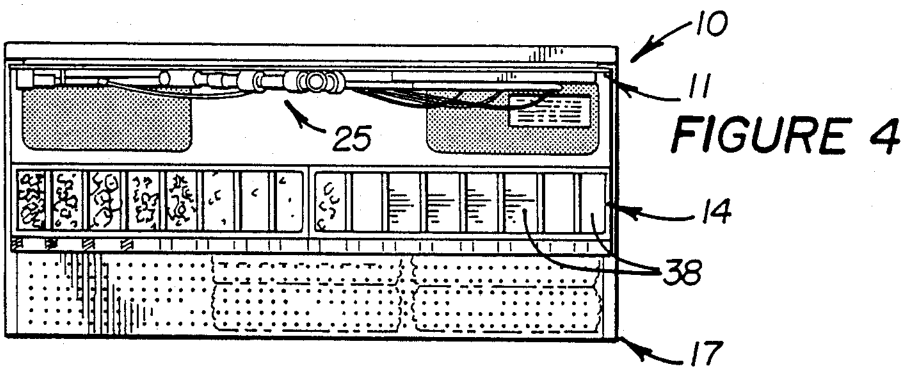
FIG. 4 is a top plan view of the display stand.

FIGS. 1–4 illustrate a water system display stand 10 adapted to be placed in a hardware store, nursery, garden shop or other retail outlet. The display stand, as described more fully hereinafter, can be "knocked-down" for ease of portability of its component parts and expeditiously erected into its illustrated final form. The display stand includes a display panel 11, including a vertically disposed exhibit panel 12, mounted on an upper shelf 13 along with a pair of aligned tray assemblies 14. The shelf is mounted on a pair of laterally spaced support brackets each releasably attached to an upstanding support frame 16 in a conventional manner.

Figure 2:
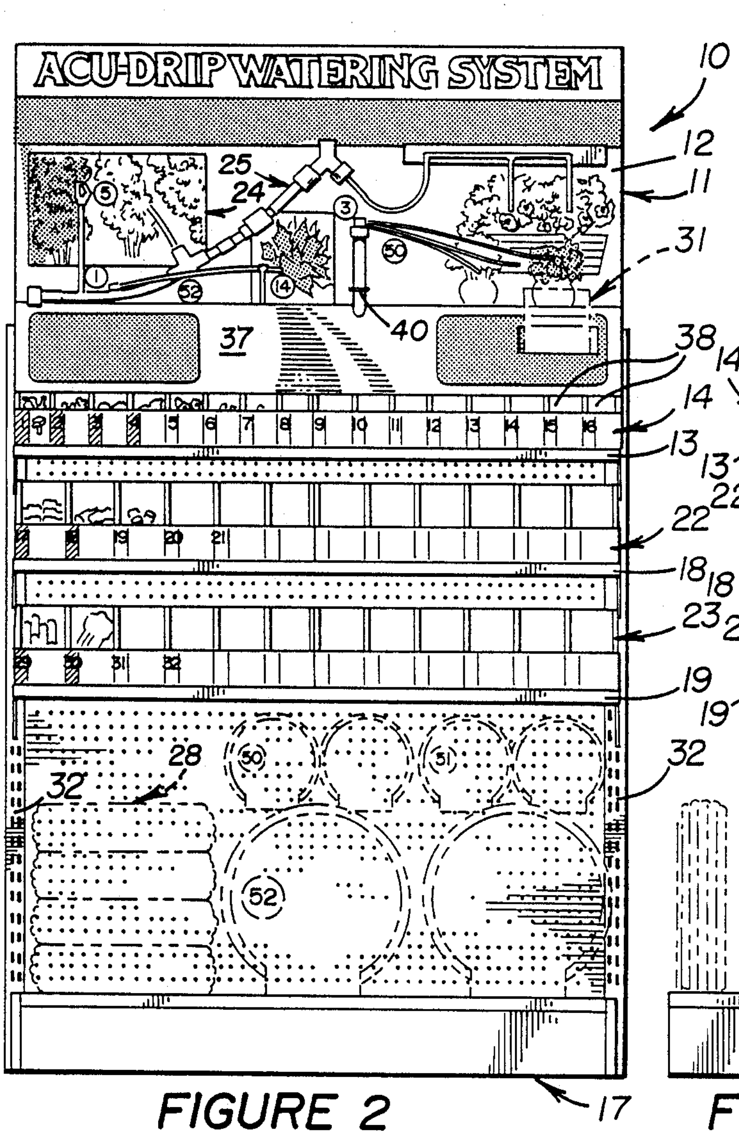
FIG. 2 is a frontal elevational view of the display stand.
Figure 3:
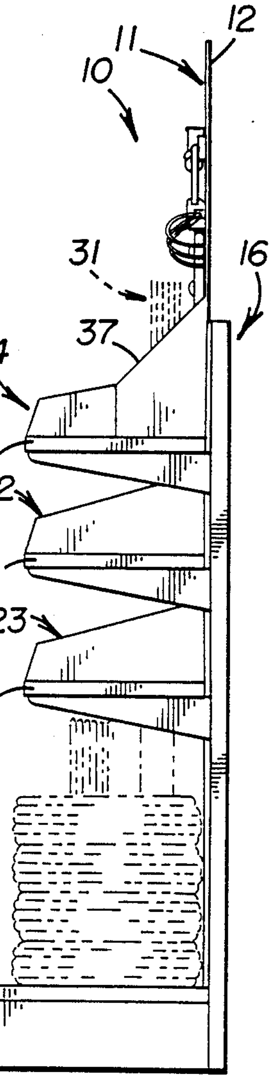
FIG. 3 is a right side elevational view of the display stand with the opposite left side of the display stand being a mirror image of the side shown.

The lower end of the support frame is suitably attached to a floor-mounted base 17 whereby the unitized display stand is rendered self-standing. As shown in FIGS. 1–3, additional shelves 18 and 19 are spaced vertically below upper shelf 13 and are mounted on support brackets 20 and 21, respectively, also attached to support frame 16. Additional pairs of tray assemblies 22 and 23 are mounted on shelves 18 and 19, respectively, and are identical to tray assemblies 14, except that they extend the full depth of their respective shelves, as more clearly shown in FIG. 3.

A unique aspect of this invention is the provision of a graphic display 24 imprinted or otherwise suitably formed on exhibit panel 12 to depict a variety of garden plants, such as trees, shrubs, flowers and the like. A mock watering system 25, including a plurality of authentic interconnected irrigation components, is mounted on the exhibit panel to provide an instructional watering system for the garden plants graphically depicted thereon. In the illustrated example, the mock watering system includes a centrally positioned hose "Y" with individual shift-off valves (connectible to a spigot), tubings, connectors and the like, terminating at water distributing devices (emitters, sprayers, spinners, etc.) to simulate an actual watering system for each plant. Thus, the consumer is enabled to visually note the specific irrigation components required and can then select them from one or more of the individual trays comprising tray assemblies 14, 22, and 23.

Another unique feature of this invention is the provision of circled numerical codes 26, each imprinted on exhibit panel 12 and positioned adjacent to a respective irrigation component of watering system 25. Identical numerical codes 26' (FIG. 1) are imprinted on each tray of the tray assemblies to depict corresponding and purchasable components retained in the trays. The consumer's selection is further aided by the imprinting of indicia 27 of each tray that pictorially depicts respective ones of the irrigation components contained in the trays.

In addition to the irrigation components retained in the tray assemblies, such components may further include conventional rolls of drip tubing 28 and porting tubing 29, suitably retained below the tray assemblies. The components retained in the tray assemblies may include standard drippers, spinners, sprays, connectors, mounting clamps, and the like, many of which are incorporated into mock watering system 25. A receptacle 30 is preferably formed at the lower end of display panel to retain planning guide pamphlets 31 (FIGS. 1-4) which contain specific information regarding the irrigation components and instructions for planning an integrated watering system.

From the above description, it is apparent that a consumer, particularly of the layman do-it-yourself type, is fully capable of self-planning the installation of a workable and efficient watering system to fit his or her needs, without the need of expert help.

DETAILED DESCRIPTION

Figure 5:
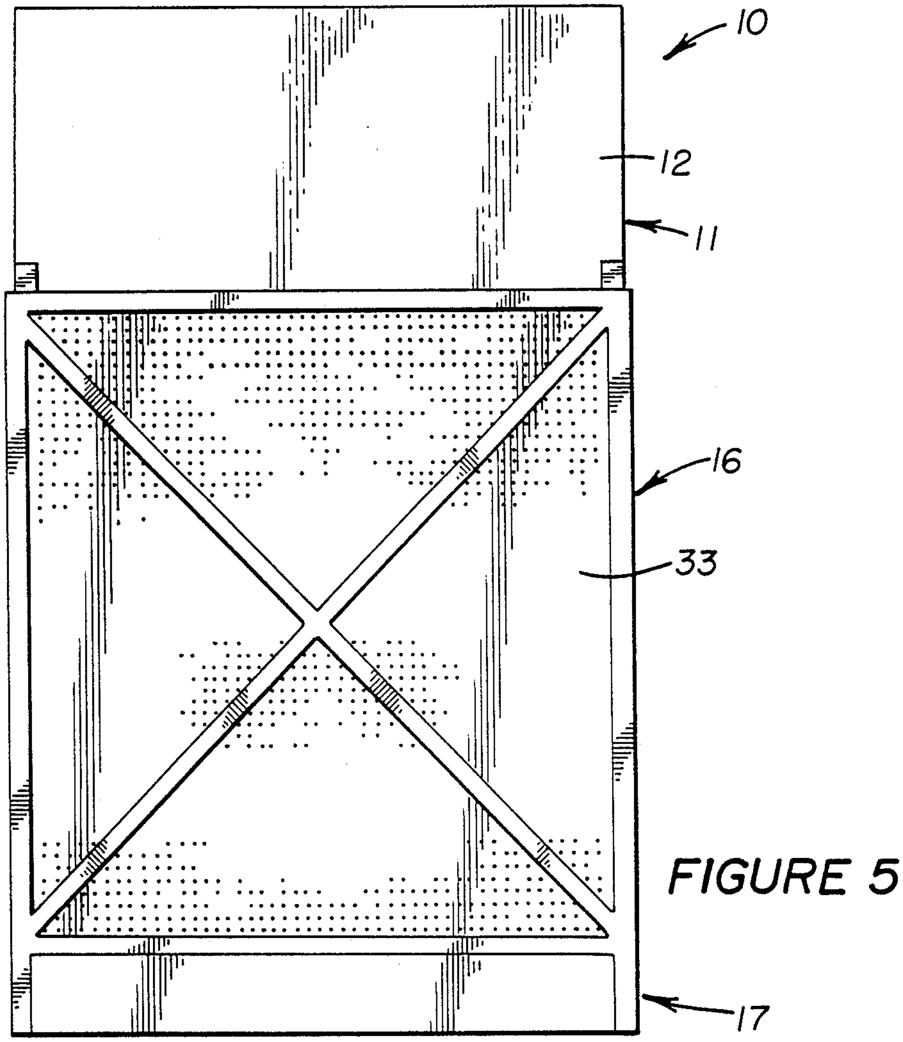
FIGS. 5 and 6 are back and bottom plan views of the display stand, respectively.
Figure 6:
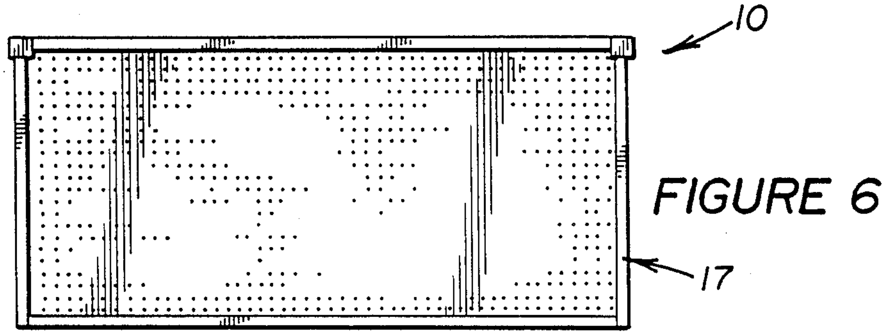
Figure 7:
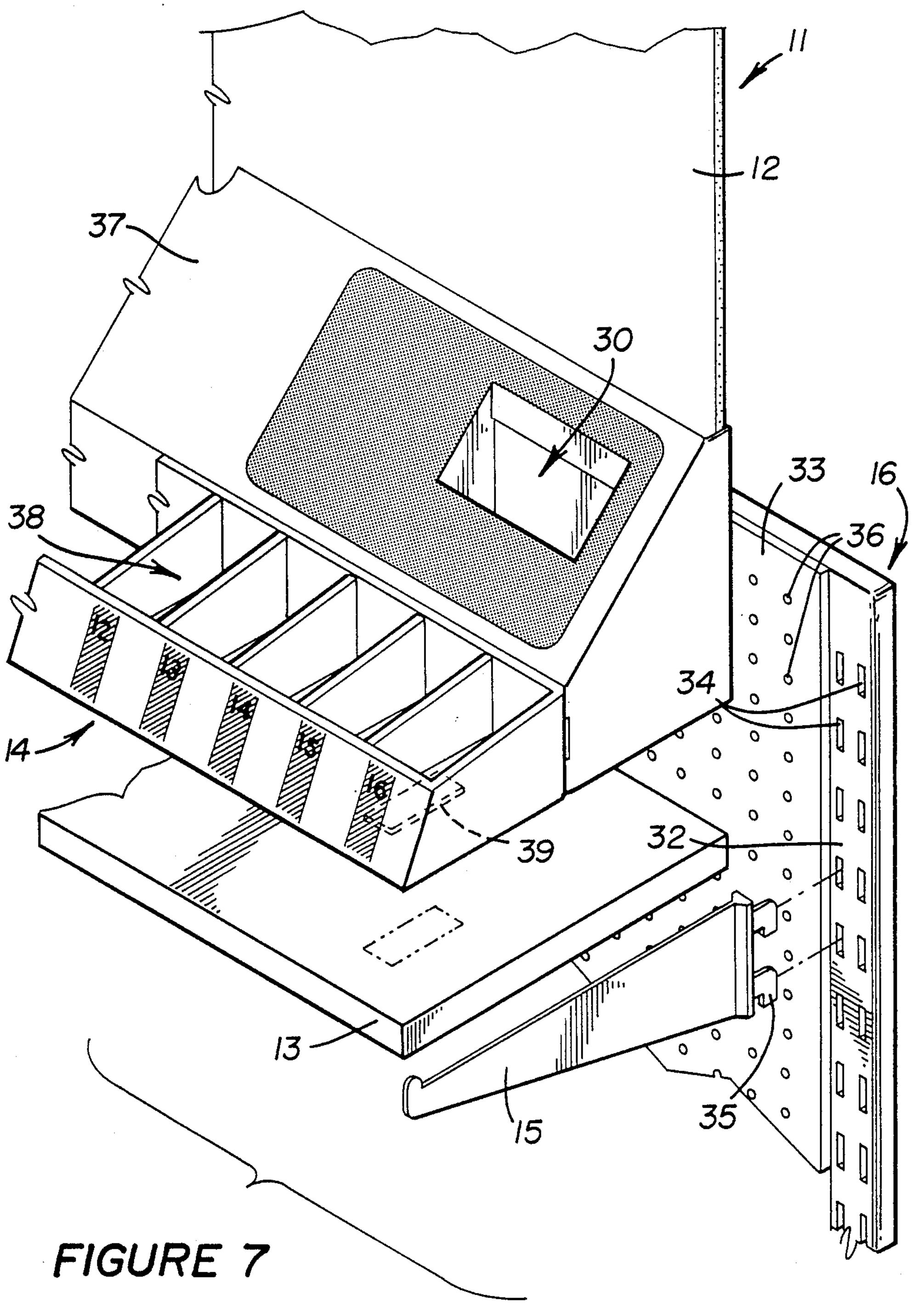
FIG. 7 is an exploded, isometric view partially illustrating a method for assembling component parts of the display stand together.

Referring to FIGS. 5-7, support frame comprises a rectangular metal frame 32 having a standard peg board 33 suitably secured thereon. The side rails of frame 32 have a plurality of vertically aligned slots 34 formed therein to receive and lock hooks 35 of each support bracket 15, 20 and 21 therein in a conventional manner. The mounting of shelf 13 on brackets 15 is typical of the mounting of shelves 18 and 19 on brackets 20 and 21, respectively.

Figure 8:
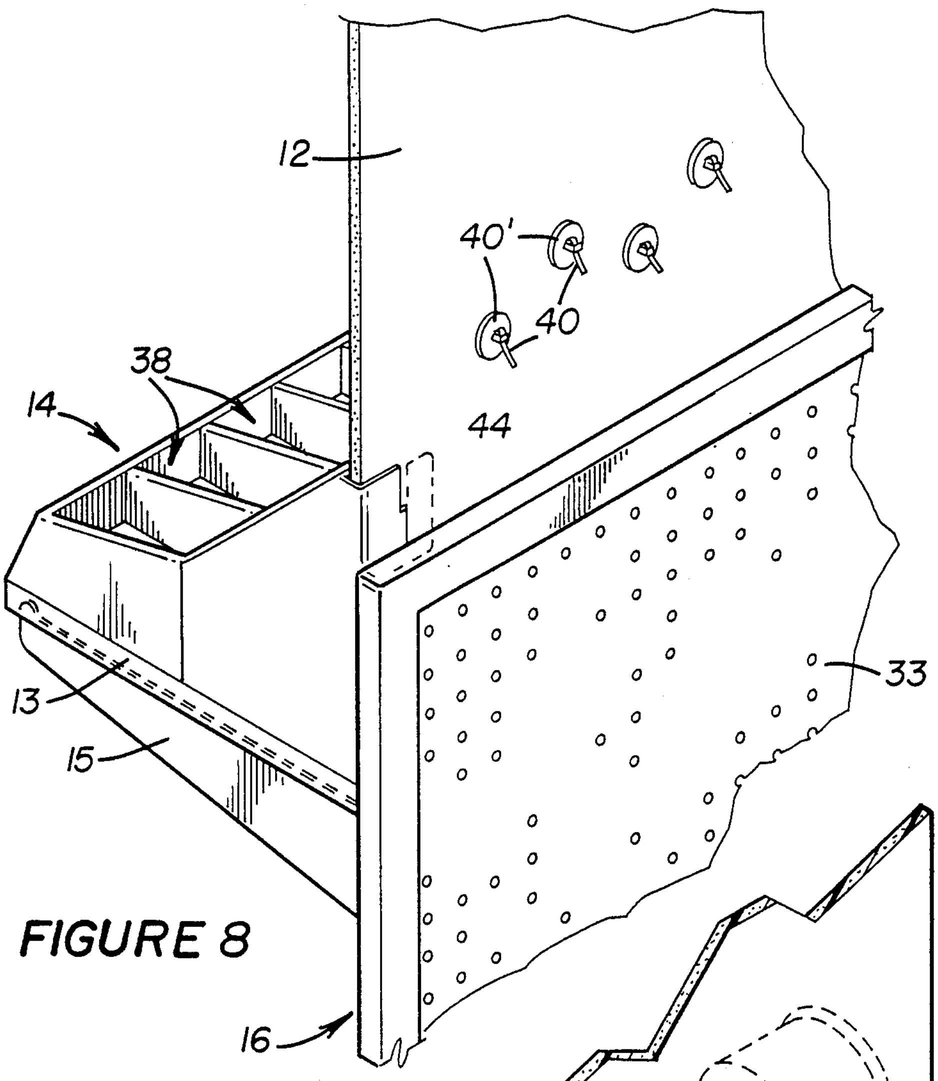
FIG. 8 is a partial backside isometric view illustrating assemblage of the FIG. 7 display stand components together.

As shown in FIGS. 7 and 8, display panel 12 rests in free-standing relationship on shelf 13 and against the frontal side of peg board 33. If so desired, the display panel can be suitably attached to the peg board by standard fasteners (not shown), projecting through holes 36 formed through the peg board. The lower end of display panel 12 has an instructional panel 37 secured thereon to slope downwardly and away from the main display surface of exhibit panel 12.

Figure 10:
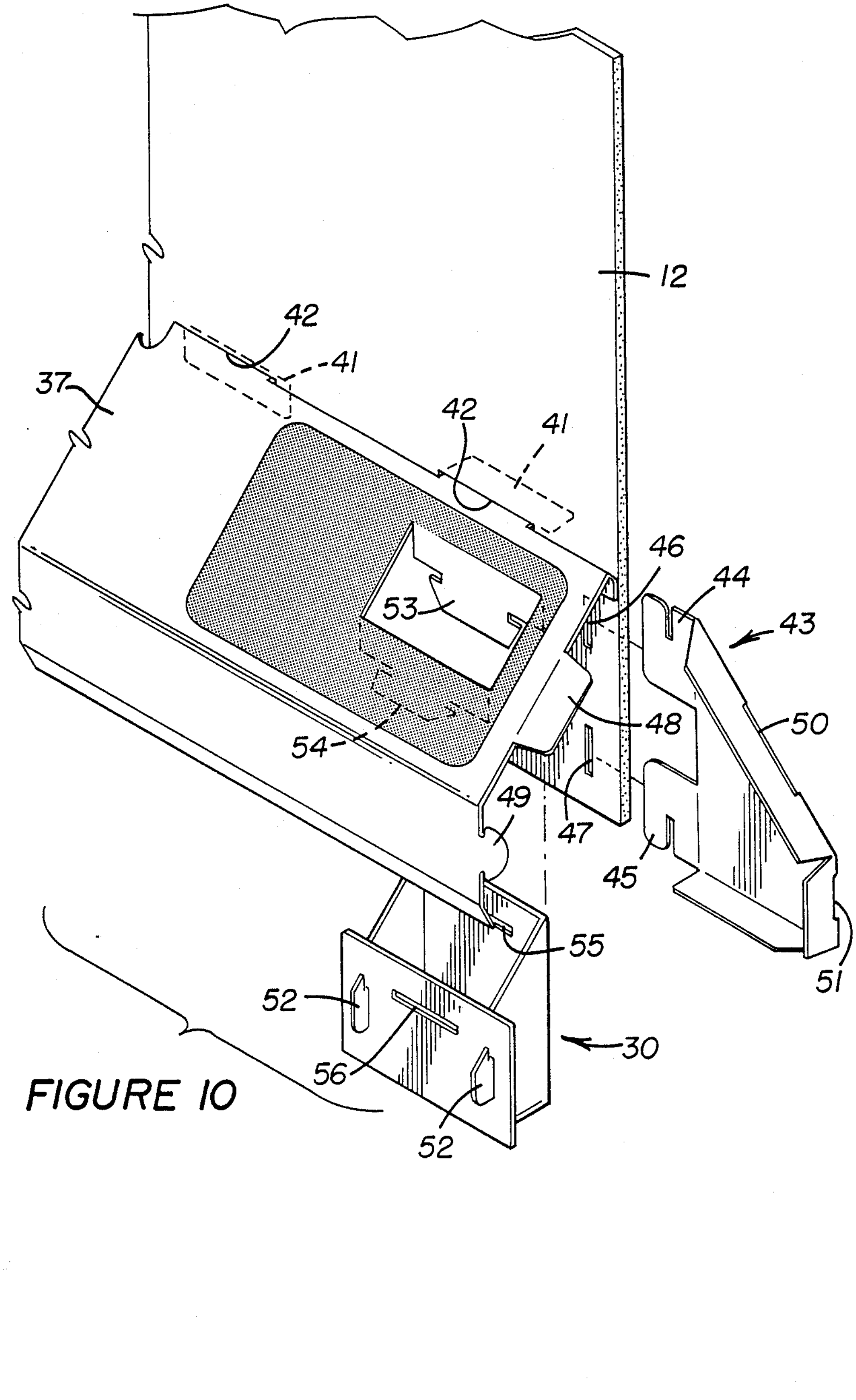
FIG. 10 is an exploded, isometric view partially illustrating a method for attaching an instructional panel on the lower end of the display panel.

Receptacle 30 is formed from a separate paperboard blank, inserted into and secured on instructional panel 37 (FIGS. 7 and 10). The receptacle is adapted to retain comprehensive planning guides 31 therein (FIG. 1) for use by the buyer-consumer. The sloped disposition of instructional panel 37 adapts it for the imprinting of various instructional and advertising matters thereon.

Each tray assembly 14 contains eight trays 38 adapted to retain various irrigation components of a planned, integrated watering system. The underside of each tray assembly has a plurality of longitudinally spaced double-sided adhesive strips 39 secured thereon (FIGS. 7 and to attach the tray assembly to the upper surface of shelf 13. Securance of the tray assemblies to the shelf will hold display panel 12 in place against peg board 33. If so desired, additional adhesive strips could be utilized to secure the backside of the tray assemblies to the frontal side of the display panel.

Figure 9:
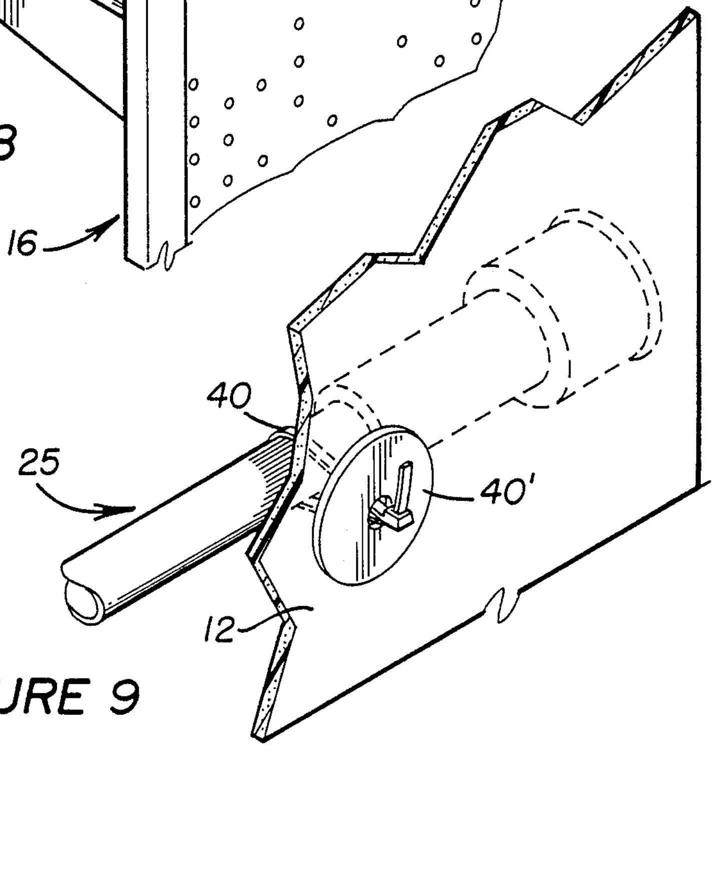
FIG. 9 illustrates a typical mounting of an irrigation component of a watering system on a display panel of the display stand.

Referring to FIGS. 1, 8 and 9, component parts of displayed watering system 25 can be suitably attached to exhibit panel 12 by individual plastic straps or ties 40 each secured in place by a washer 40', mounted on the backside of the exhibit panel. Referring to FIG. 10, the upper edge of instructional panel 37 is secured to the lower end of exhibit panel 12 by a plurality of longitudinally spaced locking tabs 41 that project through a respective slot 42, formed through the exhibit panel. Each locking tab is bent downwardly against the backside of the exhibit panel and secured thereto by a standard adhesive.

As further shown in FIG. 10, each end of the instructional panel 37 is closed by a paperboard end closure panel 43. The end closure panel has a pair of locking tabs 44 and 45 that are bent and inserted through slots 46 and 47, respectively, formed in exhibit panel 12 and adhesively secured thereto (FIG. 8). Additional locking tabs 48 and 49 are adapted to be inserted into locking engagement within slots 50 and 51, respectively, formed adjacent to folded corners of end closure panel 43.

Receptacle 30 is formed from a suitably cut, scored and folded paperboard blank attached together by tabs 52. The receptacle is retained on instructional panel 37 by a pair of locking tabs 53 and 54 connected at opposite edges of an opening formed through the instructional panel. The locking tabs are inserted through slots 55 and 56, respectively, formed through the receptacle.

Figure 12:
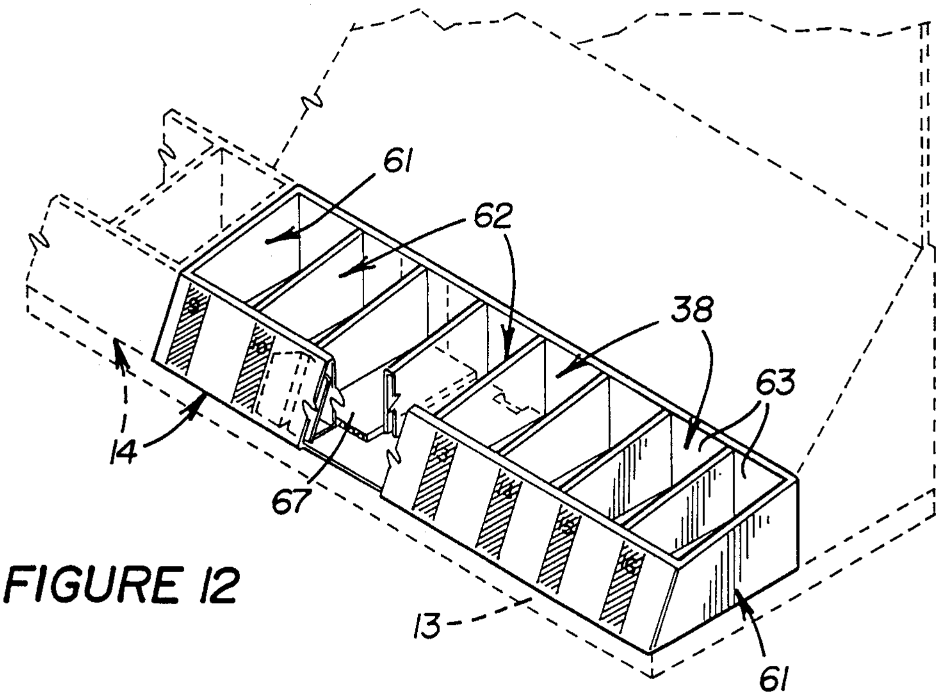
FIG. 12 is a frontal isometric view, illustrating erection of the tray assembly.
Figure 11:
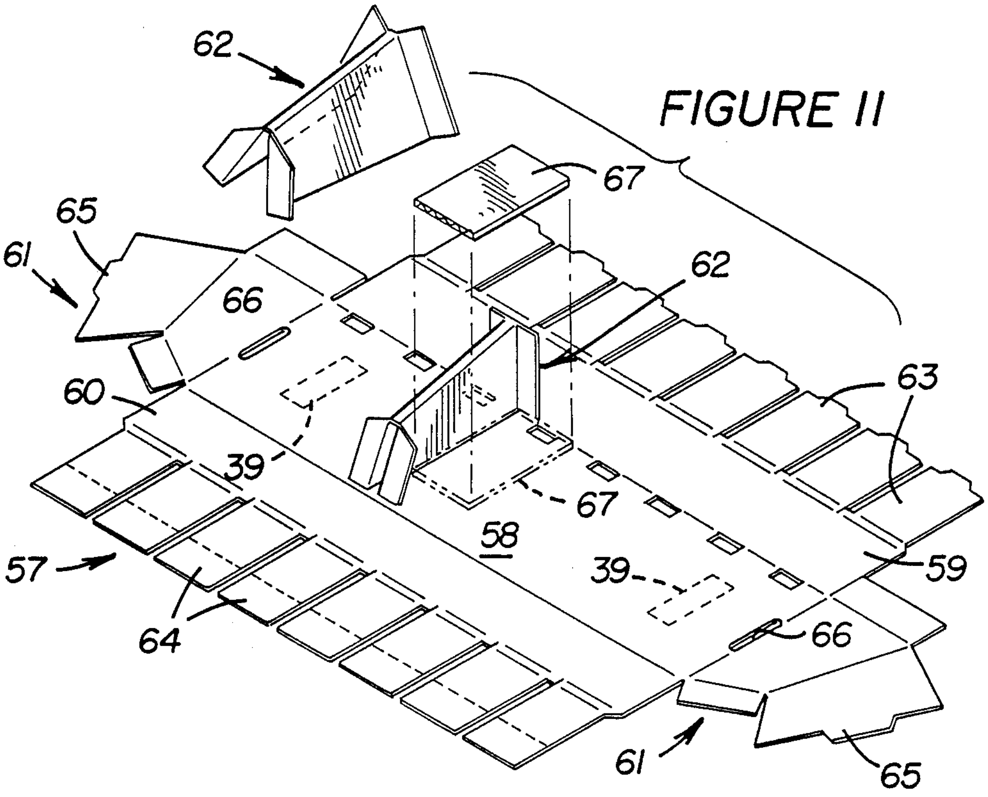
FIG. 11 is an exploded, isometric view illustrating paperboard blanks used to form a typical tray assembly employed in the display stand.

Referring to FIGS. 11 and 12, each tray assembly 14 is formed from a suitably cut and scored paperboard blank 57 having a bottom panel 58 and a pair of side panels 59 and 60 hingedly connected to opposite sides of the bottom panel. End panel assemblies 61 are also connected to the bottom panel, as described more fully hereinafter.

A plurality of longitudinally spaced and parallel divider panel assemblies 62 are suitably folded and mounted on bottom panel 58 and retained thereon by foldable flaps 63 and 64, hingedly connected to outer ends of side panels 59 and 60, respectively. In particular, each flap 63 and 64 is folded inwardly and downwardly to overlie end flaps of each adjacent pair of divider panel assemblies. As shown in FIG. 11, a locking tab can be formed on the end of each flap 63 for engagement within a respective slot formed through bottom panel 58.

End panel assemblies 61 are each hingedly connected to an end of bottom panel 58 and folded inwardly and locked in a vertical position by locking tab 65, engaged within a slot 66 formed through the bottom panel. A rectangular paperboard insert 67, forming the exposed bottom of each tray 38, is pressed within each tray to firmly engage and hold the various flaps and panels defining the tray in their erected conditions (FIG. 12). As stated above, each tray assembly 22 and 23 are identical to tray assembly 14, except for size.

Although a pair of tray assemblies are disposed in tandem relationship on each shelf 13, 18, and 19, it should be understood that a single or three or more tray assemblies could be mounted on each shelf. Further, display panel 11 and the tray assemblies could be mounted in a manner different from that described above, e.g., mounted directly on a wall, as will be appreciated by those skilled in the art relating hereto. Also, although each tray is described and shown as having eight separate trays, the number of trays can be varied to adapt the display stand for a particular need.

I claim:

1. A watering system display stand comprising a display panel graphic display means on said display panel for depicting a variety of garden plants, watering system means, including a plurality of interconnected irrigation components, mounted on said display panel for visually displaying a mock, instructional watering system for said garden plants, tray means, disposed vertically below said display panel, for holding and individually displaying corresponding ones of said irrigation components said tray means comprising a plurality of individual trays, and a plurality of code means on said display panel each positioned adjacent to a respective one of said irrigation components thereon and an identical code means on each respective one of said trays.

2. The watering system display stand of claim 1 further comprising indicia means on each of said trays for pictorially depicting each respective one of said irrigation components.

3. The watering system display stand of claim 1 wherein said irrigation components comprise tubings, drippers, spinners, sprays and connectors and means for attaching some of said components to said display panel.

4. The watering system display stand of claim 1 wherein said display panel comprises a vertically disposed exhibit panel having each of said graphic display means and said watering system means thereon.

5. The watering system display stand of claim 4 wherein said display panel further comprises an instructional panel secured to a lower end of said exhibit panel to slope downwardly and away therefrom.

6. The watering system display stand of claim 5 further comprising receptacle means on said instructional panel for retaining a plurality of planning guides thereon.

7. The watering system display stand of claim 6 wherein said instructional panel comprises a separate pair of end closure panels attached to said exhibit panel by a plurality of locking tab means.

8. The watering system display stand of claim 6 wherein said receptacle is formed from a folded blank and locking tab means for securing said receptacle means to said instructional panel.

9. The watering system display stand of claim 1 further comprising an upstanding support frame attached to a floor-mounted base and a plurality of vertically spaced shelves mounted on said support frame, said tray means mounted on each of said shelves.

10. The watering system display stand of claim 9 wherein each of said tray means comprises a tray assembly including a plurality of individual trays.

11. The watering system display stand of claim 10 wherein said tray assembly comprises a cut and scored blank having a bottom panel, a pair of side panels hingedly connected to opposite sides of said bottom panel and a pair of end panel assemblies hingedly connected to opposite ends of said bottom panel.

12. The watering system display stand of claim 11 further comprising locking tab means for locking each said end panel assembly in a vertical position to said bottom panel.

13. The watering system display stand of claim 11 further comprising a plurality of foldable flaps hingedly connected to outer ends of each of said side panels and a plurality of longitudinally spaced, parallel and separate divider panel assemblies mounted on said bottom panel, each divider panel assembly having end flaps thereon and wherein each of said foldable flaps are folded inwardly and downwardly to overlie end flaps of each adjacent pair of divider panel assemblies.

14. The watering system display stand of claim 13 further comprising an insert pressed within each said tray to firmly engage and hold flaps and panels defining said tray in an erected condition and to form an exposed bottom of said tray.

15. A watering system display stand comprising a display panel graphic display means on said display panel for depicting a variety of garden plants, watering system means, including a plurality of interconnected irrigation components, mounted on said display panel for visually displaying a mock, instructional watering system for said garden plants, and tray means, disposed vertically below said display panel, for holding and individually displaying corresponding ones of said irrigation components, said display panel comprising a vertically disposed exhibit panel having each of said graphic display means and said watering system means thereon and an instructional panel secured to a lower end of said exhibit panel to slope downward and away therefrom.

16. A watering system display stand comprising a display panel graphic display means on said display panel for depicting a variety of garden plants, watering system means, including a plurality of interconnected irrigation components, mounted on said display panel for visually displaying a mock, instructional watering system for said garden plants, tray means disposed vertically below said display panel, for holding and individually displaying corresponding ones of said irrigation component, said tray means comprising a tray assembly including a plurality of individual trays, and a cut and scored blank having a bottom panel, a pair of side panels hingedly connected to opposite sides of said bottom panel and a pair of end panel assemblies hingedly connected to opposite ends of said bottom panel, an upstanding support frame attached to a floor-mounted base, and a plurality of vertically spaced shelves mounted on said support frame, said tray means mounted on each of said shelves.

* * * * *

UNITED STATES PATENT AND TRADEMARK OFFICE

CERTIFICATE OF CORRECTION

PATENT NO. : 4,832,607

DATED : May 23, 1989

INVENTOR(S) : Paul L. Dorrell

It is certified that error appears in the above-identified patent and that said Letters Patent is hereby corrected as shown below:

Column 2, line 26, after "brackets" insert --15,--

Column 3, line 9, after "panel" insert --11--

Column 3, line 50, after "and" insert --11)--

Signed and Sealed this

Sixteenth Day of January, 1990

*Attest:*

JEFFREY M. SAMUELS

*Attesting Officer*

*Acting Commissioner of Patents and Trademarks*